(12) United States Patent
Ashida (10) Patent No.: US 8,844,666 B2
(45) Date of Patent: Sep. 30, 2014

(54) MOTORCYCLE HAVING EVAPORATING FUEL TREATMENT APPARATUS (75) Inventor: Naohiro Ashida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 13/604,014

(22) Filed: Sep. 5, 2012

(65) Prior Publication Data

US 2013/0075181 A1  Mar. 28, 2013

(30) Foreign Application Priority Data

Sep. 27, 2011  (JP) ................ 2011-210040

(51) Int. Cl.
*B62D 61/02* (2006.01)
*B62J 37/00* (2006.01)

(52) U.S. Cl.
CPC .................................. *B62J 37/00* (2013.01)
USPC ........................................................ 180/219

(58) Field of Classification Search
USPC ............................ 180/218, 219, 225; 123/519
See application file for complete search history.

(56) References Cited

U.S. PATENT DOCUMENTS

| 8,113,312 B2* | 2/2012 | Seki et al. ............... 180/225 |
| 8,210,305 B2* | 7/2012 | Koike ...................... 180/219 |
| 8,256,557 B2* | 9/2012 | Suzuki ..................... 180/219 |
| 8,316,979 B2* | 11/2012 | Seki ........................ 180/219 |
| 8,418,794 B2* | 4/2013 | Shibata et al. ........... 180/219 |
| 2011/0100742 A1* | 5/2011 | Shibata et al. ........... 180/219 |
| 2011/0308874 A1* | 12/2011 | Tanaka .................... 180/219 |

FOREIGN PATENT DOCUMENTS

| EP | 2258938 A1 | 12/2010 |
| JP | 56-53973 A | 5/1981 |
| JP | 06-340281 A | 12/1994 |

* cited by examiner

*Primary Examiner* — Tony Winner
(74) *Attorney, Agent, or Firm* — Birch, Stewart, Kolasch & Birch, LLP (57) ABSTRACT A motorcycle includes a vehicle body frame having a head pipe axially supporting a steering shaft and a main frame extending rearwardly and downwardly therefrom. A down tube extends downwardly. An internal combustion engine is supported by the vehicle body frame with a cylinder extending upward from a crankcase. A fuel tank is arranged on the upper side of the main frame. An air-intake apparatus is configured to supply air to the internal combustion engine wherein an evaporable fuel storage container is configured to store evaporating fuel generated in the fuel tank and supply the evaporating fuel to an air-intake apparatus when the internal combustion engine is in operation is arranged in a space on the rear side of an upper portion of the down tube, the lower side of the fuel tank, and on the front side or on the upper side of the cylinder of the internal engine.

12 Claims, 10 Drawing Sheets

MOTORCYCLE HAVING EVAPORATING FUEL TREATMENT APPARATUS

CROSS-REFERENCE TO RELATED APPLICATIONS

The present application claims priority under 35 USC 119 to Japanese Patent Application No. 2011-210040 filed Sep. 27, 2011 the entire contents of which are hereby incorporated by reference.

BACKGROUND OF THE INVENTION

1. Field of the Invention

The present invention relates to a layout structure of an evaporating fuel treatment apparatus of a motorcycle.

2. Description of Background Art

In the related art, there is a motorcycle having a canister arranged on a vehicle body as an evaporating fuel storage container of an evaporating fuel treatment apparatus for the motorcycle. See, for example, JP-A-6-340281. The evaporating fuel treatment apparatus is configured to collect evaporating fuel evaporated in a fuel tank during a stop by the canister without allowing the same to be dispersed in the atmospheric air, suck collected fuel from the canister using a negative pressure of an engine air-intake system generated by starting an engine, and burn the same in an internal combustion engine.

The motorcycle has not much room in space in terms of structure, so that flexibility of the arrangement of the evaporating fuel storage container canister is limited. Also, since an adsorption-desorption performance of the canister with respect to the evaporating fuel has a feature that purging efficiency for discharging evaporating fuel adsorbed in the canister is improved if the temperature of the canister is high, and charge efficiency for adsorbing evaporating fuel is improved if the temperature of the canister is low, the canister is susceptible to heat received from the internal combustion engine or an exhaust pipe, the outdoor air temperature, direct rays, the air flow or the like. Thus, the arrangement of the canister while improving the performance of the canister and simultaneously achieving space-saving is difficult.

SUMMARY AND OBJECTS OF THE INVENTION

In view of such circumferences as described above, it is an object of the present invention to provide a motorcycle including an evaporating fuel treatment apparatus arranged so as to improve an evaporating fuel treatment performance of an evaporating fuel storage container while achieving a space-saving.

According to an embodiment of the present invention, a motorcycle includes a vehicle body frame having a head pipe configured to axially support a steering shaft, a main frame extending rearward and downward from the head pipe, and a down tube extending downward from the head pipe. An internal combustion engine is supported by the vehicle body frame, including a crankcase, a cylinder, and a cylinder head, and a head cover, the cylinder extending upward from the crankcase. A fuel tank is arranged on the upper side of the main frame with an air-intake apparatus configured to supply air to the internal combustion engine. An evaporable fuel storage container, configured to store evaporating fuel generated in the fuel tank of the motorcycle and supply the evaporating fuel to the air-intake apparatus when the internal combustion engine is in operation, is arranged in a space on the lower side of the fuel tank and on the front or on the upper side of the cylinder of the internal combustion engine on the upper rear of the down tube.

According to an embodiment of the present invention, an air-exhaust pipe is connected to a front portion of the cylinder head of the internal combustion engine extends forward and then is curved and extends rearward with a muffler being mounted on a rear end of the air-exhaust pipe. The evaporable fuel storage container is arranged on the upper side of a curved portion of the air-exhaust pipe.

According to an embodiment of the present invention, the motorcycle has a side cowl for covering a side of a front portion of the vehicle body including parts of the fuel tank and the internal combustion engine. The fuel tank has a saddle shape with the side of the fuel tank being covered with the side cowl. A dome-shaped space is formed on the upper side of the internal combustion engine with the evaporable fuel storage container being arranged at a dome-shaped space.

According to an embodiment of the present invention, the air-exhaust pipe is connected to a front surface of the cylinder head on one of the left and right of the down tube in front view of the vehicle body, extends forward, is curved outward of the vehicle body and then extends rearward. The evaporable fuel storage container is mounted on the down tube at a position offset toward the air-exhaust pipe.

According to an embodiment of the present invention, the charge piping connects the fuel tank and the evaporable fuel storage container and is configured to feed the evaporating fuel from the fuel tank to the evaporable fuel storage container. Purge piping connects the evaporable fuel storage container and the air-intake apparatus of the internal combustion engine, allowing the evaporating fuel stored in the evaporable fuel storage container to be sucked into the internal combustion engine by the intake air negative pressure and for performing a fuel treatment. Drain piping communicates the evaporable fuel storage container with the atmospheric air, wherein the evaporable fuel storage container is mounted with a longitudinal axis thereof oriented in the vehicle width direction. The charge piping and the purge piping are connected to one side thereof, and the drain piping is connected on the other side thereof, and at least part of the evaporable fuel storage container on the side of the drain piping is overlapped with the down tube in front view.

According to an embodiment of the present invention, the evaporable fuel storage container is mounted on a bracket provided on the down tube via a supporting member mounted to cover the outer periphery thereof. The supporting member is formed to cover at least part of the evaporable fuel storage container which is not overlapped with the down tube in a front view in a state wherein the evaporable fuel storage container is mounted on the bracket.

According to an embodiment of the present invention, the motorcycle includes a wind break panel provided on the vehicle body frame or a side cover. The wind break panel is arranged on the front side of the evaporable fuel storage container.

According to an embodiment of the present invention, an electrical component provided on the motorcycle is mounted on the side opposite from the offset side of the evaporable fuel storage container.

According to an embodiment of the present invention, a saddle portion bottom plate of the fuel tank is formed so as to incline upward from the rear to the front.

According to an embodiment of the present invention, the evaporable fuel storage container is positioned on the lower side of the upper end portion of a front fender.

According to an embodiment of the present invention, the dead space of the motorcycle is effectively used and an improvement of the flexibility of the layout of the vehicle body is achieved. In addition, since the evaporating fuel storage container is arranged on the upper rear side of the down tube, the evaporating fuel storage container is protected from external force. In addition, since the evaporating fuel storage container is arranged in a space on the lower side of the fuel tank and the front side or the upper side of the internal combustion engine, the discharged heat of the internal combustion engine is transferred to the evaporating fuel storage container. Simultaneously, since the evaporating fuel storage container is arranged on the lower side of the fuel tank, the atmospheric temperature of the evaporating fuel storage container during the operation of the internal combustion engine is increased by causing discharged heat of the internal combustion engine to be accumulated, so that purging efficiency can be increased. Also, while the vehicle is parked, by the arrangement of the evaporating fuel storage container on the lower side of the fuel tank, the evaporating fuel storage tank is prevented from being easily exposed to direct sunlight. With the evaporating fuel storage tank being arranged away from the ground, the effect of radiation is reduced, so that the atmospheric temperature of the evaporating fuel storage container is maintained at low temperatures, and an improvement in the charge efficiency is achieved.

According to an embodiment of the present invention, since the evaporating fuel storage container is arranged on the upper side of the curved portion of the air-exhaust pipe, the discharged heat from the air-exhaust pipe is transferred to the evaporating fuel storage container. Thus, a further improvement of the purging efficiency is achieved.

According to an embodiment of the present invention, the dome-shaped space is defined on the upper side of the internal combustion engine by forming the fuel tank into the saddle shape and covering the side of the fuel tank with the side cowl and the evaporating fuel storage container is arranged in the dome-shaped space. Therefore, the discharged heat from the internal combustion engine is accumulated into the dome-shaped space to increase the atmospheric temperature at a portion near the evaporating fuel storage container, so that the improvement of the purging efficiency is achieved.

According to an embodiment of the present invention, with the arrangement of the evaporating fuel storage container immediately above the air-exhaust pipe, easy transfer of the discharged heat from the air-exhaust pipe to the evaporating fuel storage container is achieved.

According to an embodiment of the present invention, since a flow of air is prevented from blowing against the drain side of the evaporating fuel storage container, the fuel stored in the evaporating fuel storage container on the drain side which is in communication with the atmospheric air can easily be discharged. Thus, the purging efficiency on the drain side is improved, and the charge efficiency of the entire evaporating fuel storage container is improved. Also, with the arrangement of the charge piping and the purge piping on the same side and the drain piping on the other side, the atmospheric air which receives a negative pressure from the air-intake system of the internal combustion engine when the vehicle is being operated flows from the drain piping provided on the one side in the direction of the longitudinal axis of the evaporating fuel storage container, and is discharged from the purge piping provided on the other side. Therefore, outside air passes through the entire part in the evaporating fuel storage container. Thus, an improvement with respect to the purging efficiency over the entire evaporating fuel storage container is achieved.

According to an embodiment of the present invention, since the supporting member is formed to cover at least part of the evaporating fuel storage container which is not overlapped with the down tube, the flow of air is shielded by the supporting member. Thus, the flow of air is prevented from blowing against the evaporating fuel storage container, so that an improvement with respect to the purging efficiency is achieved. Furthermore, with the supporting member mounted so as to cover the outer periphery of the evaporating fuel storage container, the atmospheric temperature when the vehicle is parked can hardly be transferred to the evaporating fuel storage container. Thus, an improvement with respect to the charge efficiency is achieved.

According to an embodiment of the present invention, since the wind break panel is arranged on the front side of the evaporating fuel storage container, the flow of air is prevented from blowing against the evaporating fuel storage container. Thus, an improvement with respect to the purging efficiency is achieved. Furthermore, the improvement of the charge efficiency is achieved by bringing the evaporating fuel storage container into a shadow-covered state in a parking state.

According to an embodiment of the present invention, since the electrical components are mounted on the side opposite from the offset side with respect to the lateral direction of the evaporating fuel storage container, the effect of the discharged heat from the air-exhaust pipe arranged on the lower side of the evaporating fuel storage container is reduced, so that the electrical components which are weak against heat are protected from the discharged heat.

According to an embodiment of the present invention, since the bottom plate of the saddle portion of the fuel tank is inclined forward and upward, air warmed up by the exhaust heat from the internal combustion engine is moved forward or upward where the evaporating fuel storage container is arranged when the vehicle is stopped while idling, so that the evaporating fuel storage container is warmed up. Thus, an improvement with respect to the purging efficiency is achieved.

According to an embodiment of the present invention, since the evaporating fuel storage container is positioned on the lower side of the upper end portion of the front fender in front view, the flow of air is prevented from blowing directly against the evaporating fuel storage container.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Referring now to FIG. 1 to FIG. 8, a motorcycle according to an embodiment of the present invention will be described below.

The directions of front, rear, right, left, up, and down in this specification are based on the direction of the vehicle of the motorcycle according to the embodiment.

Figure 1:
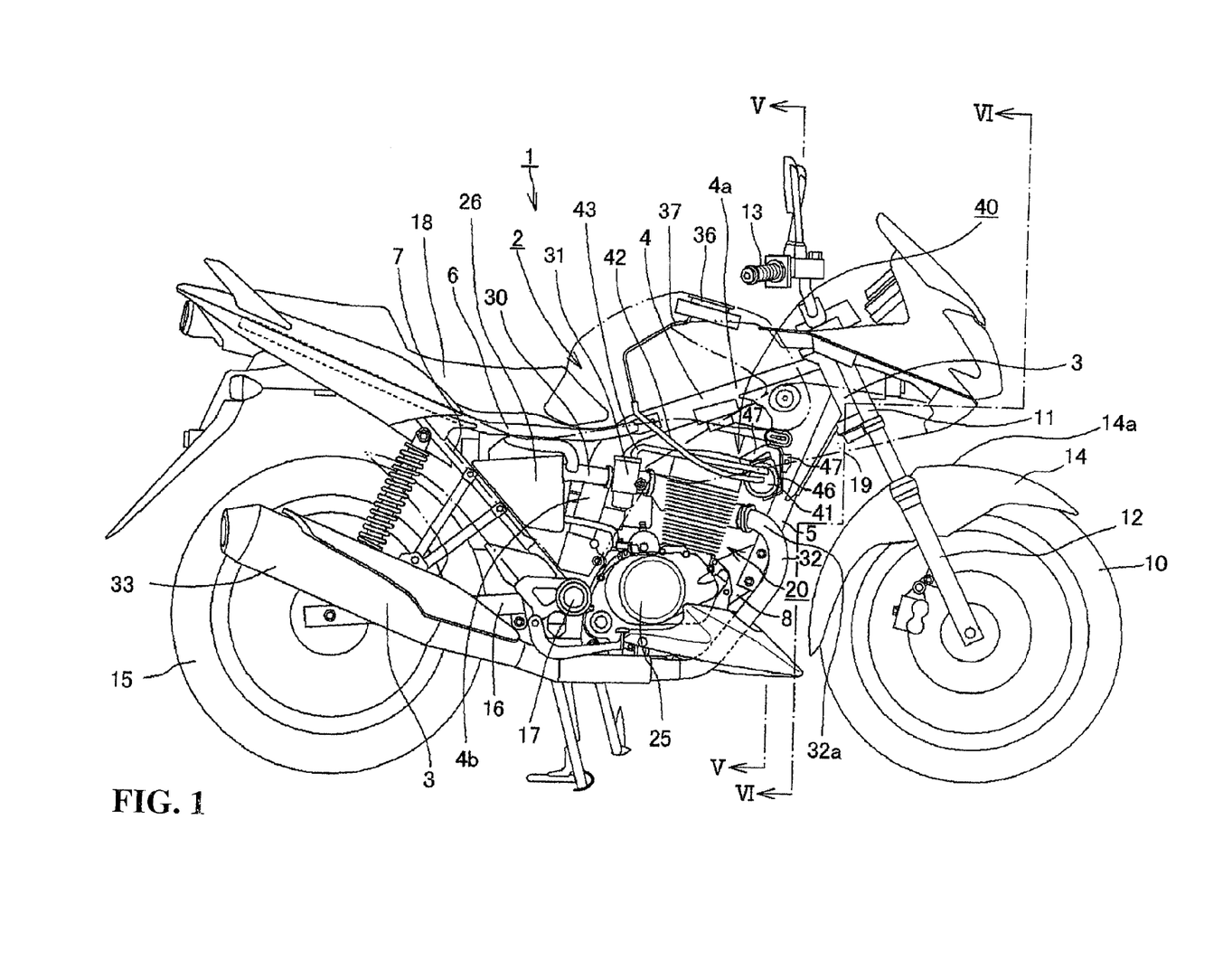
FIG. 1 is a right-side view of a motorcycle according to an embodiment of the present invention.

As shown in FIG. 1, a vehicle body frame 2 of a motorcycle 1 includes a main frame 4 having a front portion 4a extending rearward and rather obliquely downward and a rear portion 4b changing the direction and extending further downward, and extending from an upper portion of a head pipe 3 configured to support a steering shaft 11 for axially supporting a front wheel 10 so as to be steerable. A down tube 5 extends obliquely downwardly from a lower portion of the head pipe 3 with a pair of left and right seat frames 6 extending rearwardly and upwardly from the rear portion of the front portion 4a of the main frame 4. A pair of left and right side frames 7 connect the rear portion 4b of the main frame 4 and the seat frames 6. A swing arm 16 on which a rear wheel 15 is supported is supported by the main frame 4 via a pivot bolt 17 so as to be swingable in the vertical direction.

An internal combustion engine 20 mounted on the motorcycle 1 is a one-cylinder four-cycle engine including a cylinder 22, a cylinder head 23, and a head cover 24 stacked in sequence on a crankcase 21, which are integrally fastened with a bolt, not shown. The direction of a cylinder axis of the cylinder 22 is a substantially perpendicular direction inclined slightly forward, and extends upward from the crankcase 21. The internal combustion engine 20 is disposed in a space surrounded by the front portion 4a and the rear portion 4b of the main frame 4, and the down tube 5, and is supported by the rear portion 4b of the main frame 4 and the lower end of the down tube 5 via brackets. A transmission 25 is arranged behind the internal combustion engine 20, with a power output from the internal combustion engine 20 being shifted and transmitted to a rear wheel 15 via a chain, not shown.

Figure 5:
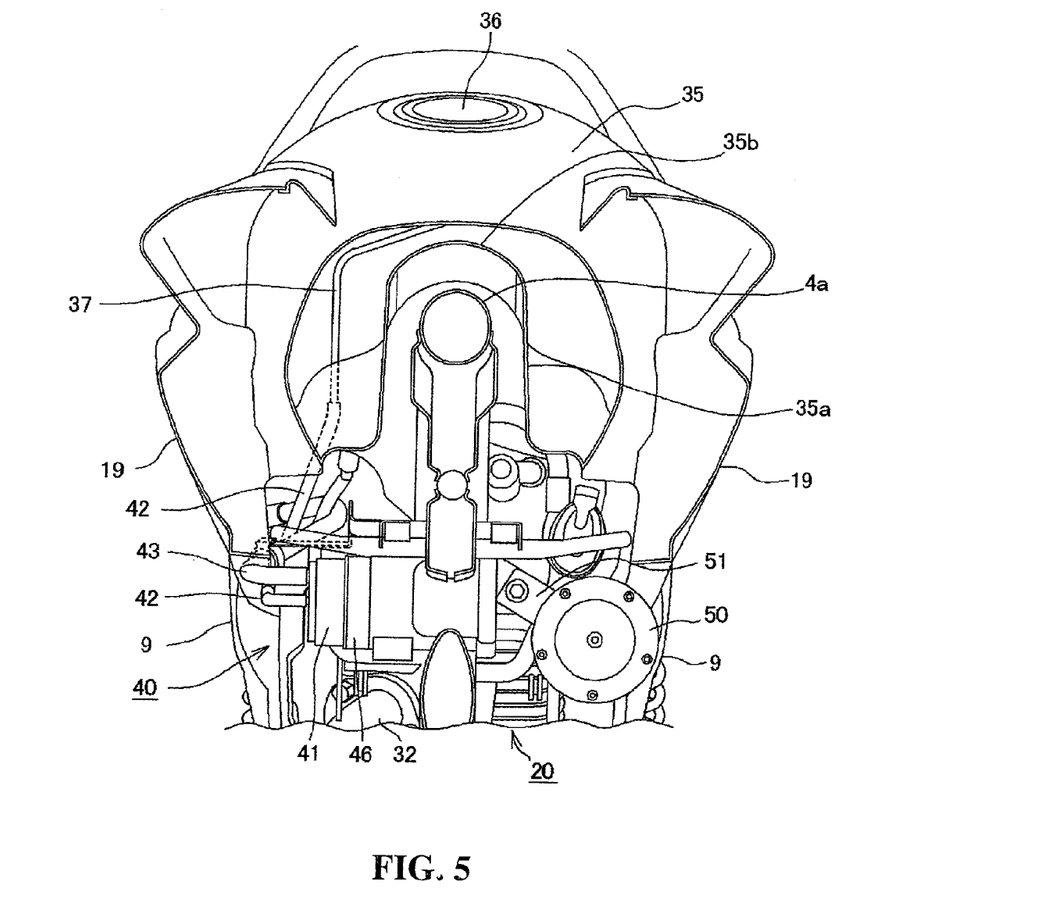
FIG. 5 is a cross-sectional view taken along the line VI-VI in FIG. 1.

A fuel tank 35 is positioned above the front portion 4a of the main frame 4 as shown in FIG. 1, and the cross-sectional shape of a bottom plate 35a of the fuel tank 35 is formed into a saddle shape as shown in FIG. 5. A saddle portion bottom plate 35b of the fuel tank 35 is formed so as to incline forward and upwardly from a rear portion of the vehicle along the front portion 4a to straddle the front portion 4a of the main frame 4. A fuel supply pot 36 is provided on an upper surface of the fuel tank 35. As shown in FIG. 1, a breather pipe 37, which is piping for sending evaporating fuel in the fuel tank 35 to an evaporable fuel processing apparatus 40, extends obliquely rearwardly from a position near the fuel supply pot 36 and extends further downwardly, and then extends from the bottom plate 35a of the fuel tank 35 to the outside of the fuel tank 35.

A seat 18 is mounted at a position rearward of the fuel tank 35 and upward of the seat frames 6.

An air cleaner 26 is disposed on the back side of the internal combustion engine 20 and on the lower side of the seat 18 and the seat frames 6, an air-intake pipe 44 from the air cleaner 26 is connected to a rear portion of the cylinder head 23 of the internal combustion engine 20 via a carburetor 31, so that the outside air and fuel supplied from the fuel tank are mixed by the carburetor 31 and are supplied to the internal combustion engine 20.

Figure 6:
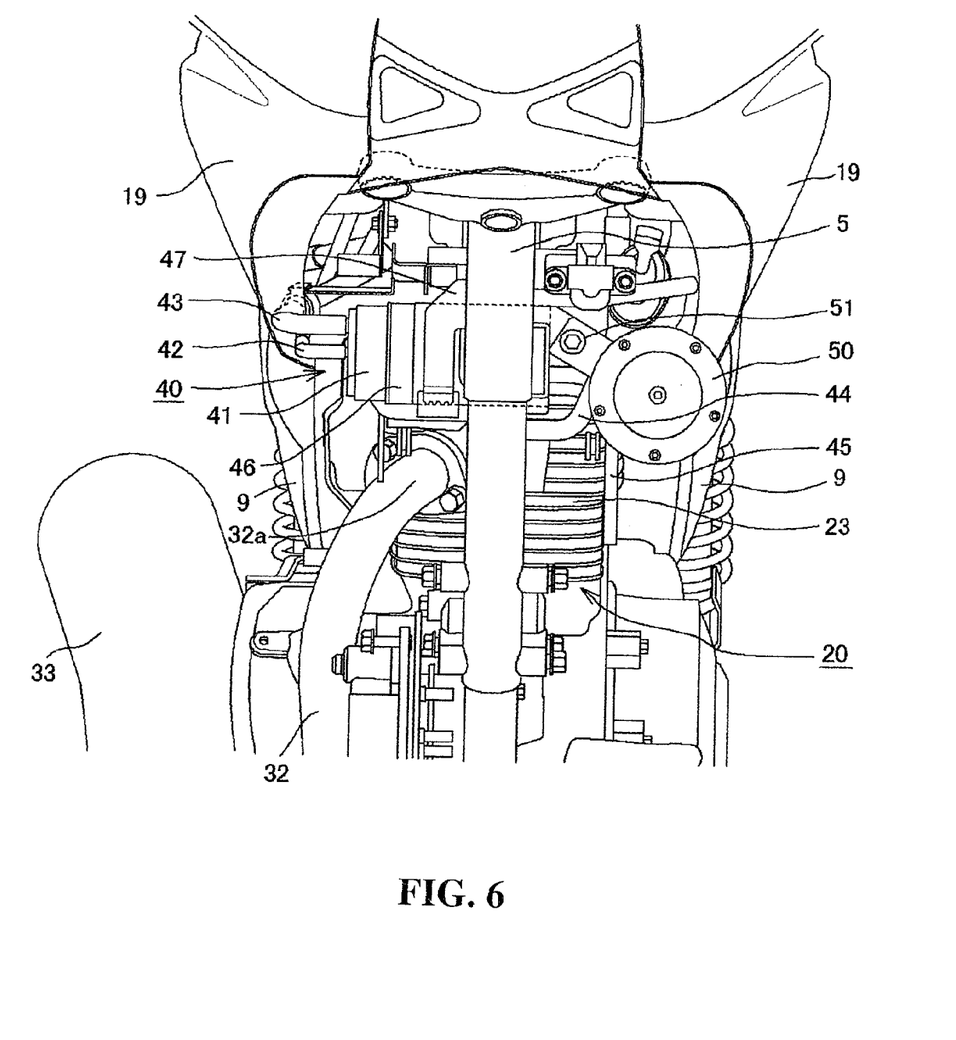
FIG. 6 is a cross-sectional view taken along the line V-V in FIG. 1.

An air-exhaust pipe 32 configured to discharge combustion gas discharged from the internal combustion engine 20 extends forward from the right side of the front portion of the cylinder head 23 and then is curved to form a curved portion 32a, passes below the internal combustion engine 20 and extends rearward from the curved portion 32a, and a muffler 33 configured to silence discharged air is connected to the air-exhaust pipe 32. The air-exhaust pipe 32 is mounted on the cylinder head 23 at a position offset rightward from a centerline of the down tube 5 in front view of the vehicle body as shown in FIG. 6.

Figure 2:
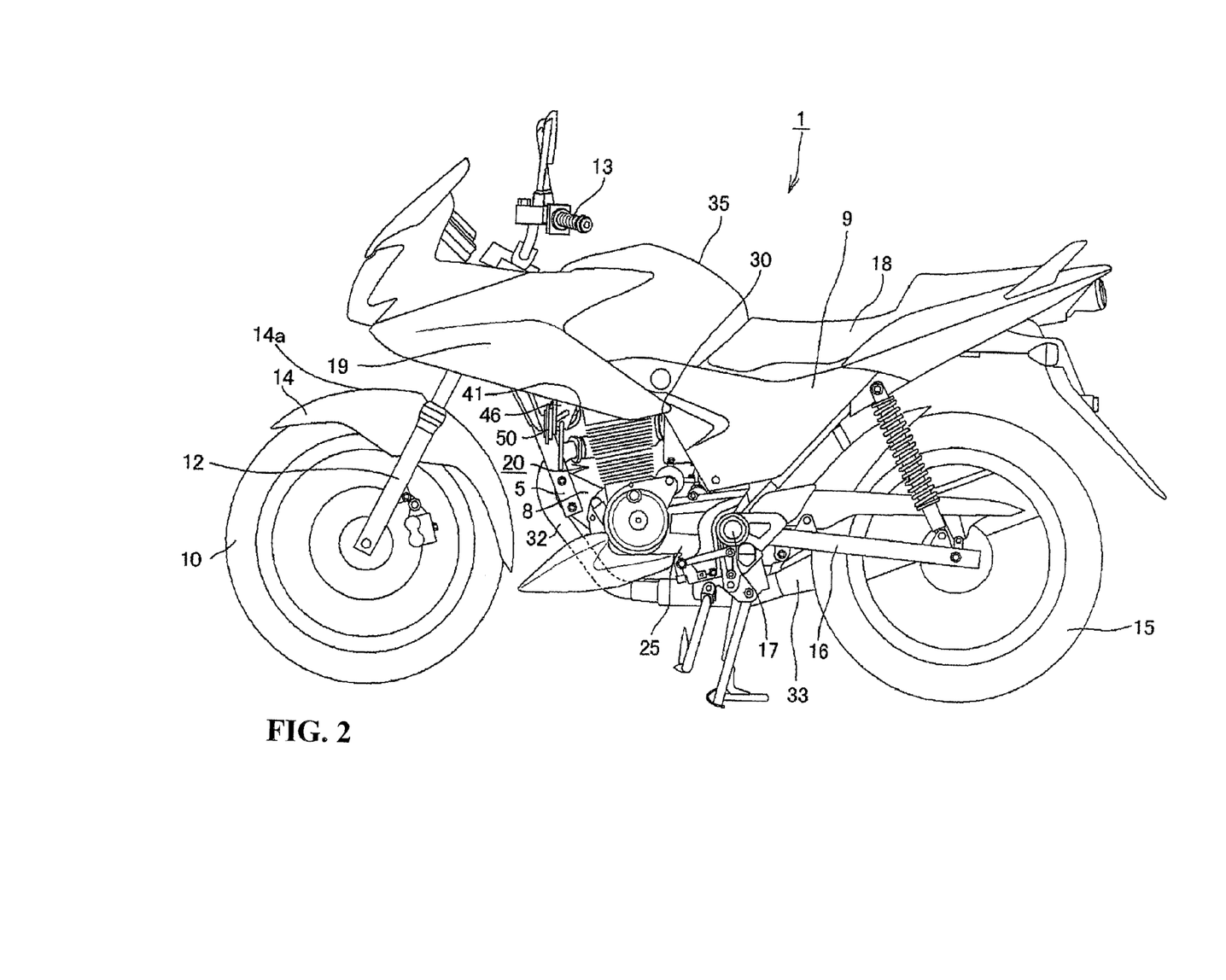
FIG. 2 is a left side view of the motorcycle.

As shown in FIG. 2, the motorcycle 1 includes side cowls 19 each mounted thereon and formed so as to cover a front portion of the fuel tank 35 and part of the internal combustion engine 20 from the front side portion of the vehicle body, and includes side covers 9 mounted on both left and right side surfaces so as to cover side surfaces of the vehicle body. In addition, a front fender 14 positioned from above to the rear of the front wheel 10 for shielding mud is supported by a pair of front forks 12.

The motorcycle 1 includes an evaporable fuel processing apparatus 40 configured to adsorb and store the evaporating fuel generated in the fuel tank 35 during a stop of the vehicle in the interior of a canister 41 as the evaporating fuel storage container, and send the fuel adsorbed in the canister 41 during the operation of the internal combustion engine 20 to the internal combustion engine by a negative pressure of the air-intake apparatus, so that the evaporating fuel is prevented from being discharged to the atmosphere.

Figure 4:
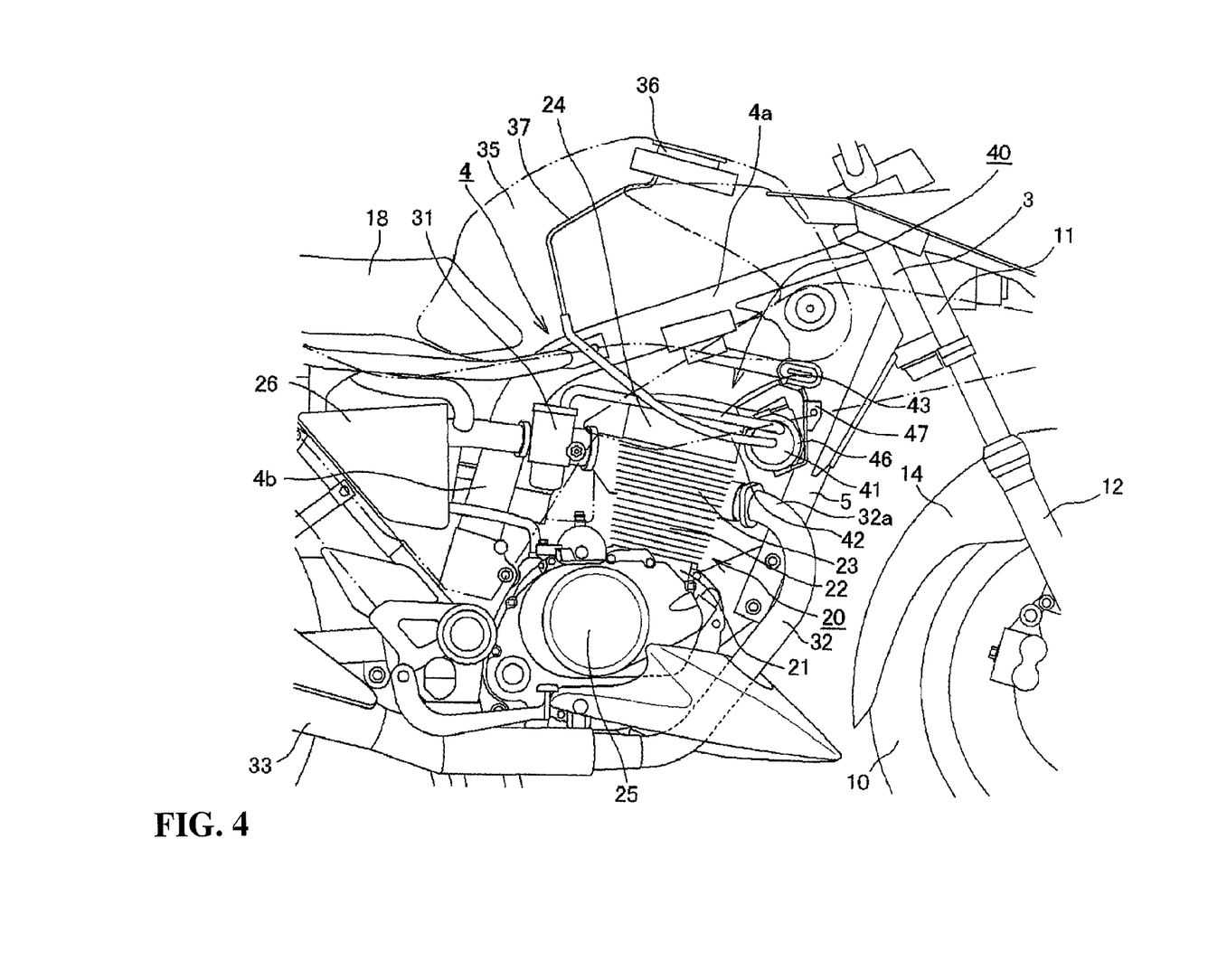
FIG. 4 is an enlarged right side view of the principal portion of FIG. 1.

As shown in FIG. 4, since the canister 41 is positioned below the fuel tank 35 and upward and forward of the internal combustion engine 20, and is supported at the rear of the down tube 5 by brackets 47 via a canister holder 46, discharged heat from the internal combustion engine 20 can easily be transferred to the canister 41, and the traveling wind blowing against the canister 41 is reduced by the down tube 5.

As shown in FIG. 6, the canister 41 is disposed so as to be positioned on the right side of the down tube 5, which is the same side as the air-exhaust pipe 32 is mounted so as to be positioned on the upper side of the air-exhaust pipe 32, so that discharged heat from the air-exhaust pipe 32 is transferred.

Figure 3:
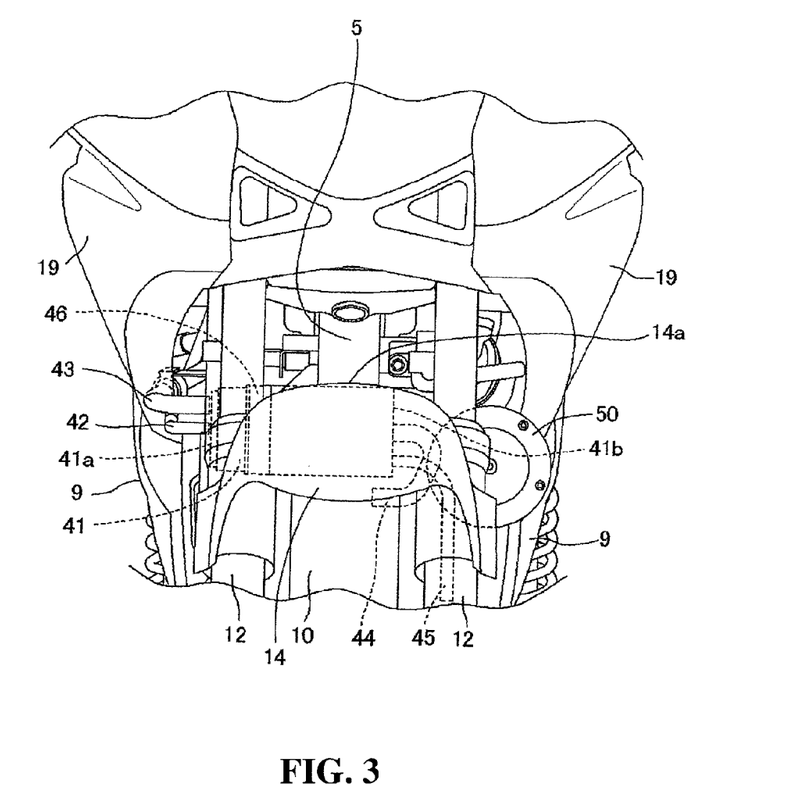
FIG. 3 is an enlarged front view of a principal portion of the motorcycle.

Furthermore, the canister 41 is disposed downward of an upper end portion 14a of the front fender 14 in a front view of the vehicle as shown in FIG. 3, and a flow of air blowing against the canister 41 is alleviated by the front fender 14.

The canister 41 is formed into a cylindrical shape elongated in the axial direction, and includes an adsorptive agent such as activated coal stuffed up therein, and is mounted so that the longitudinal direction is directed in the vehicle width direction.

As shown in FIG. 4, connected to a substantially center of a right side surface 41a of the canister 41 is a charge pipe 42, and the other end of the charge pipe 42 is connected to a breather pipe 37 extending outward from the fuel tank 35, so that evaporating fuel generated by warmed-up fuel in the fuel tank 35 during the parking of the motorcycle 1 or the like is fed into the canister 41.

Furthermore, a purge pipe 43 is connected to an upper portion of the right side surface 41a of the canister 41 at a position above the charge pipe 42, and the other end of the purge pipe 43 is connected to the carburetor 31. When the internal combustion engine 20 is operated, the fuel stored in the canister 41 is sent to the carburetor 31 by a negative pressure of the air-intake pipe 44, is mixed with ambient air by the carburetor 31, is sent to the internal combustion engine 20 and is burned therein.

Figure 8:
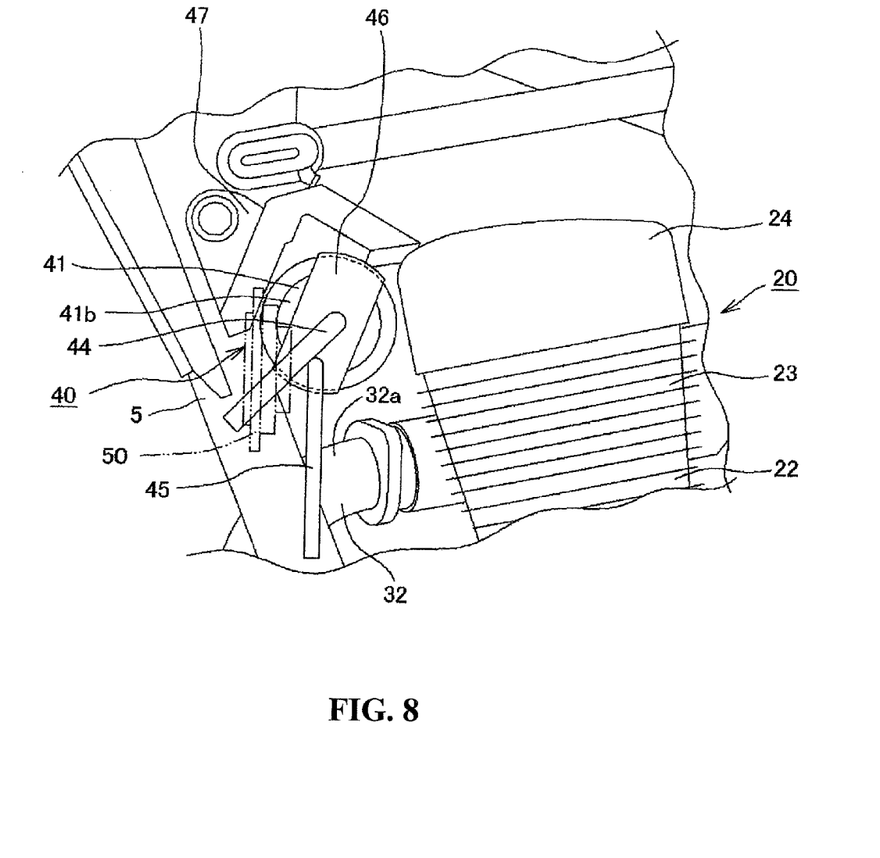
FIG. 8 is an enlarged left side view of the principal portion of the motorcycle.

As shown in FIG. 8, the air-intake pipe 44 and a drain pipe 45, which are drain pipes communicating with the atmospheric air for taking in and discharging air in the canister 41, are connected to a left side surface 41b of the canister 41.

The air intake pipe 44 is connected to a substantially center of the left side surface 41b of the canister 41 so as to be capable of taking in the outside air when the canister 41 is brought into a negative pressure. The air intake pipe 44 extends rather forward and downward and is capable of taking clean outside air which is not affected by the exhaust air from the internal combustion engine, whereby the purifying capability of the canister can be enhanced.

The drain pipe 45 is connected to the left side surface 41b of the canister 41 at a lower front position of the air intake pipe 44, so that the air in the canister 41 can be discharged to the outside air when the pressure in the canister 41 becomes a positive pressure. The drain pipe 45 extends downward by a relatively long distance, and the air discharged from the drain pipe 45 is discharged downward to a position apart from a passenger.

Figure 7:
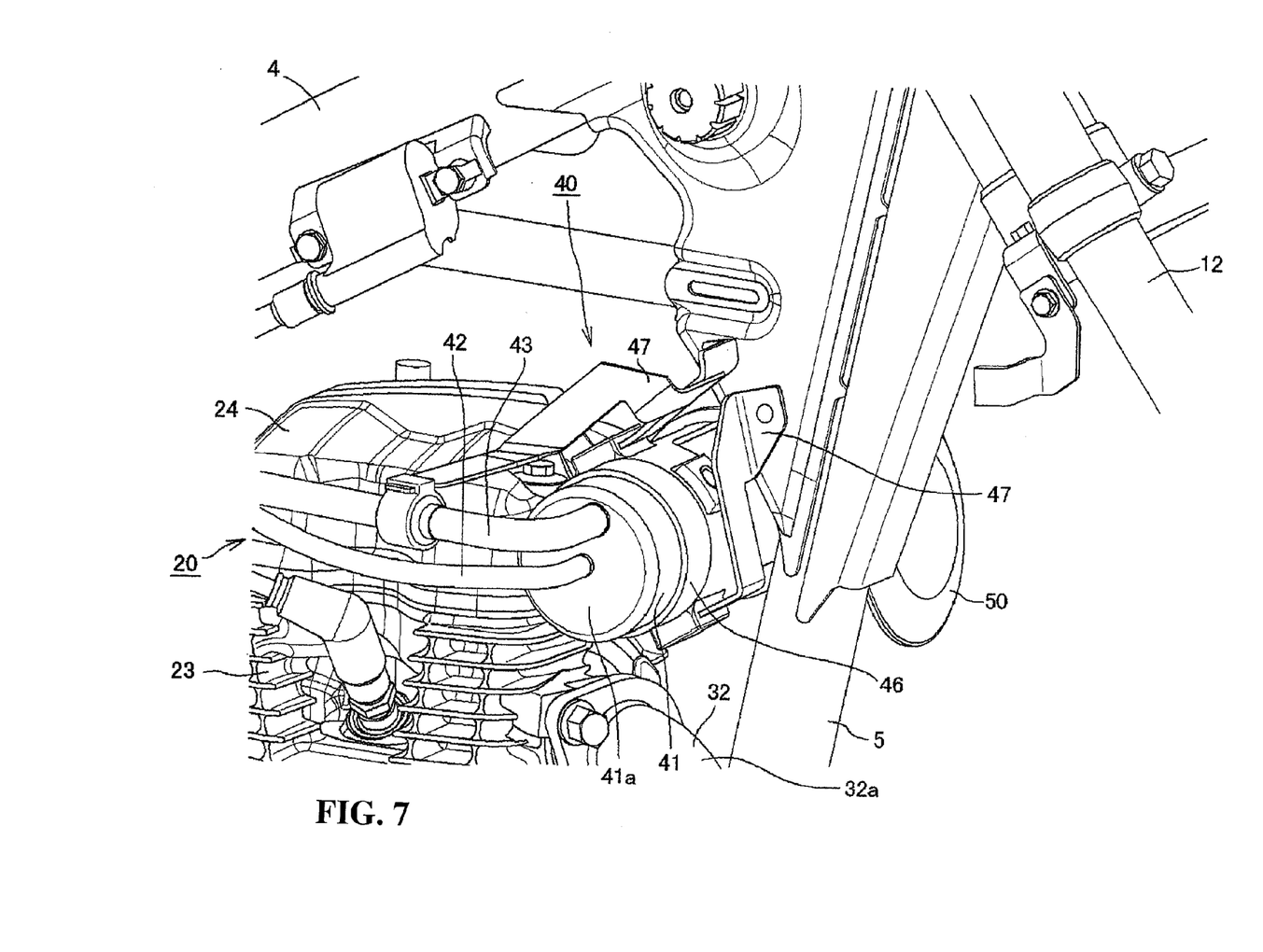
FIG. 7 is an enlarged perspective view of a principal portion of the motorcycle.

As shown in FIG. 7, the cylindrical canister 41 is enveloped so that a cylindrical surface thereof is covered with the canister holder 46 and is mounted on a back surface of the down tube 5 with the brackets 47. The canister 41 including a portion which is not overlapped with the down tube 5 in a front view is covered with the canister holder 46 as shown in FIG. 6.

Also, as shown in FIG. 6, the canister 41 is disposed so that the side of the canister 41 where the air intake pipe 44 and the drain pipe 45 are mounted overlaps with the down tube 5 in a front view.

As shown in FIG. 2, the vehicle is provided with the side cowl 19 extending from the front to the side surfaces so as to cover parts of the fuel tank 35 and the internal combustion engine 20. As shown in FIG. 5, the bottom plate 35a of the fuel tank 35 is formed into a saddle shape, and the sides of the fuel tank 35 are covered with the side cowl 19. A dome-shaped space is defined by the bottom plate 35a of the fuel tank 35 and the side cowl 19 above the internal combustion engine 20 and the canister 41, so that discharged heat from the internal combustion engine 20 is accumulated in the dome-shaped space when the internal combustion engine 20 is in operation.

As shown in FIG. 6, components that are weak against heat such as electrical components, for example, a horn 50, are mounted on the side opposite from the side where the canister 41 and the air-exhaust pipe 32 are offset with respect to the down tube with respect to the lateral direction in front view.

The motorcycle 1 according to the embodiment is configured as described above, and the canister 41 is arranged in a dead space on the upper front side of the internal combustion engine 20 and the back side of the down tube 5. Therefore, space-saving is achieved, and the flexibility of the layout of the vehicle body is improved. Furthermore, since the canister 41 is arranged on the back side of the down tube 5, the canister 41 can be protected from an external force.

Since the canister 41 is disposed within the space at a position on the lower side of the fuel tank 35 and on the front or upper side of the internal combustion engine 20, discharged heat from the internal combustion engine 20 can be transmitted easily to the canister 41, and discharged heat from the internal combustion engine 20 is accumulated on the lower side of the fuel tank 35, the atmospheric temperature of the canister 41 is increased. Thus, the purging efficiency of the canister 41 can be improved.

Furthermore, the air-exhaust pipe 32 is connected to the front portion of the cylinder head 23 of the internal combustion engine 20, the air-exhaust pipe 32 extends rearwards, and the canister 41 is positioned on the upper side of the curved portion 32a of the air-exhaust pipe 32. Therefore, high-temperature air warmed up by the discharged heat of the discharged air passing in the air-exhaust pipe 32 moves upward and heats up the canister 41, whereby the purging efficiency of the canister 41 can further be improved.

Furthermore, a bottom plate 35a of the fuel tank 35 is formed into the saddle shape, the sides of the fuel tank 35 are covered with the side cowl 19, and the dome-shaped space is defined by the bottom plate 35a of the fuel tank 35 and the side cowl 19 on the upper side of the internal combustion engine 20 and the canister 41. Therefore, the discharged heat from the internal combustion engine 20 can be accumulated in the dome-shaped space, the atmospheric air temperature of the canister 41 can be increased. Thus, an improvement with respect to the purging efficiency of the canister 41 is further achieved.

A saddle portion bottom plate 35b of the fuel tank 35 is formed to be inclined upward and forward from the back side. Therefore, the air warmed up by the discharged heat from the internal combustion engine 20 flows forward and heats up the canister 41 when the vehicle is stopped with idling or the like. Thus, an improvement with respect to the purging efficiency is achieved.

As shown in FIG. 6, the air-exhaust pipe 32 is mounted on the cylinder head 23 at a position offset rightward from the centerline of the down tube 5 and the canister 41 is arranged at a position offset rightward from the down tube 5 in front view of the vehicle body, and the canister 41 is disposed right above the air-exhaust pipe 32. Therefore, the discharged heat from the air-exhaust pipe 32 is transferred to the canister 41. Thus, a further improvement of the purging efficiency is achieved.

Since the canister 41 is disposed in such a manner that the side of the canister 41 on which the air intake pipe 44 and the drain pipe 45 as the drain piping are mounted overlaps with the down tube 5 in front view. Therefore, the a flow of air does not blow against the side of the canister 41 communicating with the atmospheric air, so that an improvement with respect to the purging efficiency on the drain side is achieved.

The cylindrical canister 41 is enveloped by the canister holder 46 so that the cylindrical surface is covered therewith and is mounted on the rear surface of the down tube 5 via the brackets 47 and the canister 41 including at least partly of the portion thereof which is not overlapped with the down tube 5 in a front view is covered with the canister holder 46. Therefore, a flow of air blowing against the portion of the canister 41 which is not overlapped with the down tube 5 is alleviated. Thus, an improvement with respect to the purging efficiency of the canister 41 is improved.

Furthermore, the canister 41 is disposed downward of an upper end portion 14a of the front fender 14 in front view of the vehicle, and a flow of air blowing against the canister 41 is alleviated by the front fender 14. Thus, an improvement with respect to the purging efficiency of the canister 41 can be improved.

Also, the canister 41 is disposed on the lower side of the fuel tank 35 and on the front upper side of the internal combustion engine 20, and is covered with the side cowl 19 from the front to the sides of the vehicle body. Therefore, the canister 41 is prevented from being exposed to direct rays from the sun when the vehicle is parked. In addition, since the canister 41 is disposed on the upper side apart from the ground, the effect of radiation heat from the ground is alleviated, and an increase in atmospheric temperature of the canister 41 is prevented, so that the improvement of the charge efficiency is achieved.

The components having no resistance to high temperatures such as electrical components, for example, a horn 50, are mounted on the side opposite from the side where the canister 41 and the air-exhaust pipe 32 are offset with respect to the down tube 5 with respect to the lateral direction in front view. Therefore, the components having no resistance to high temperatures such as the electrical components can be protected from the discharged heat from the air-exhaust pipe 32.

Figure 9:
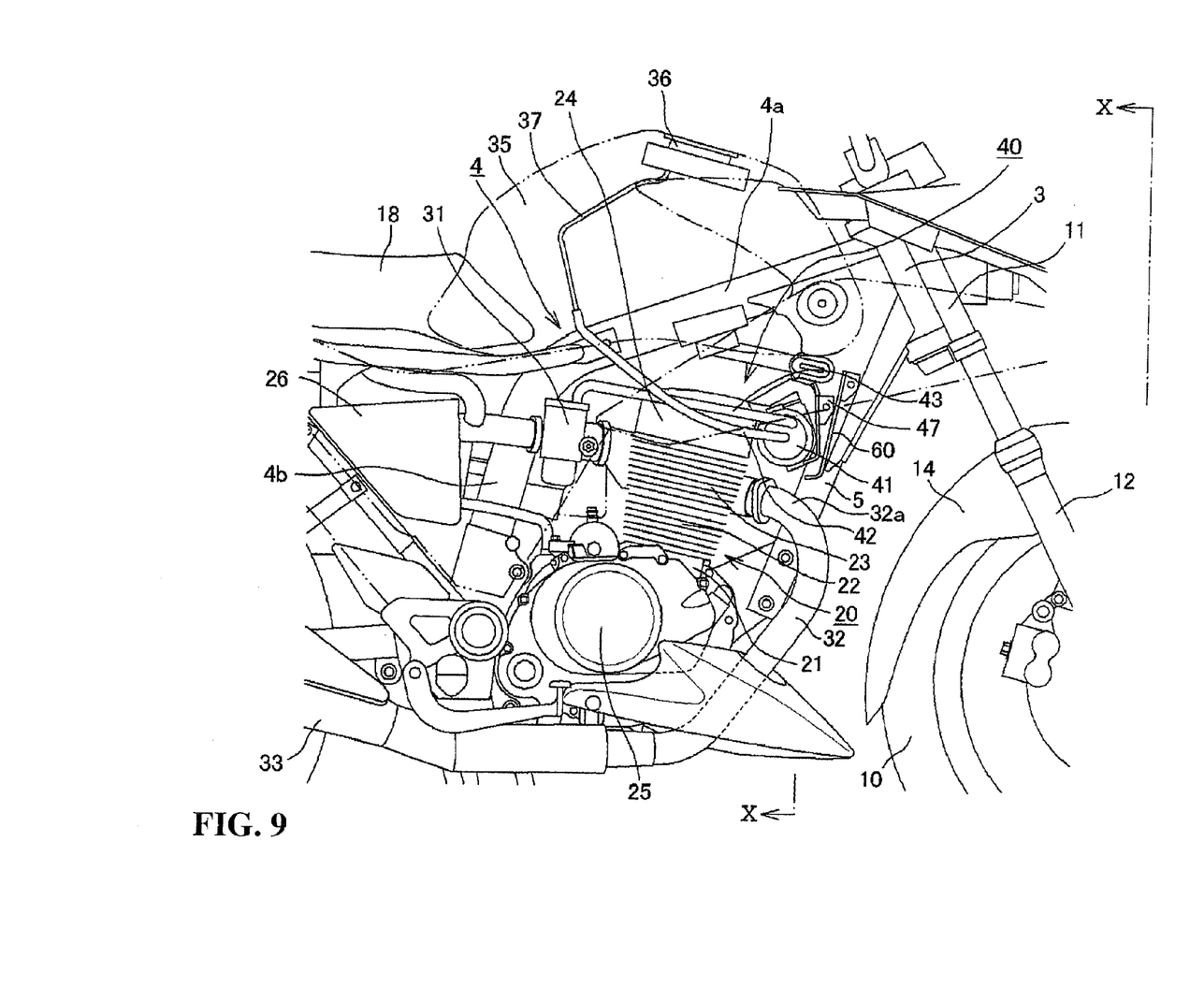
FIG. 9 is an enlarged right side view of the principal portion of the motorcycle according to another embodiment.
Figure 10:
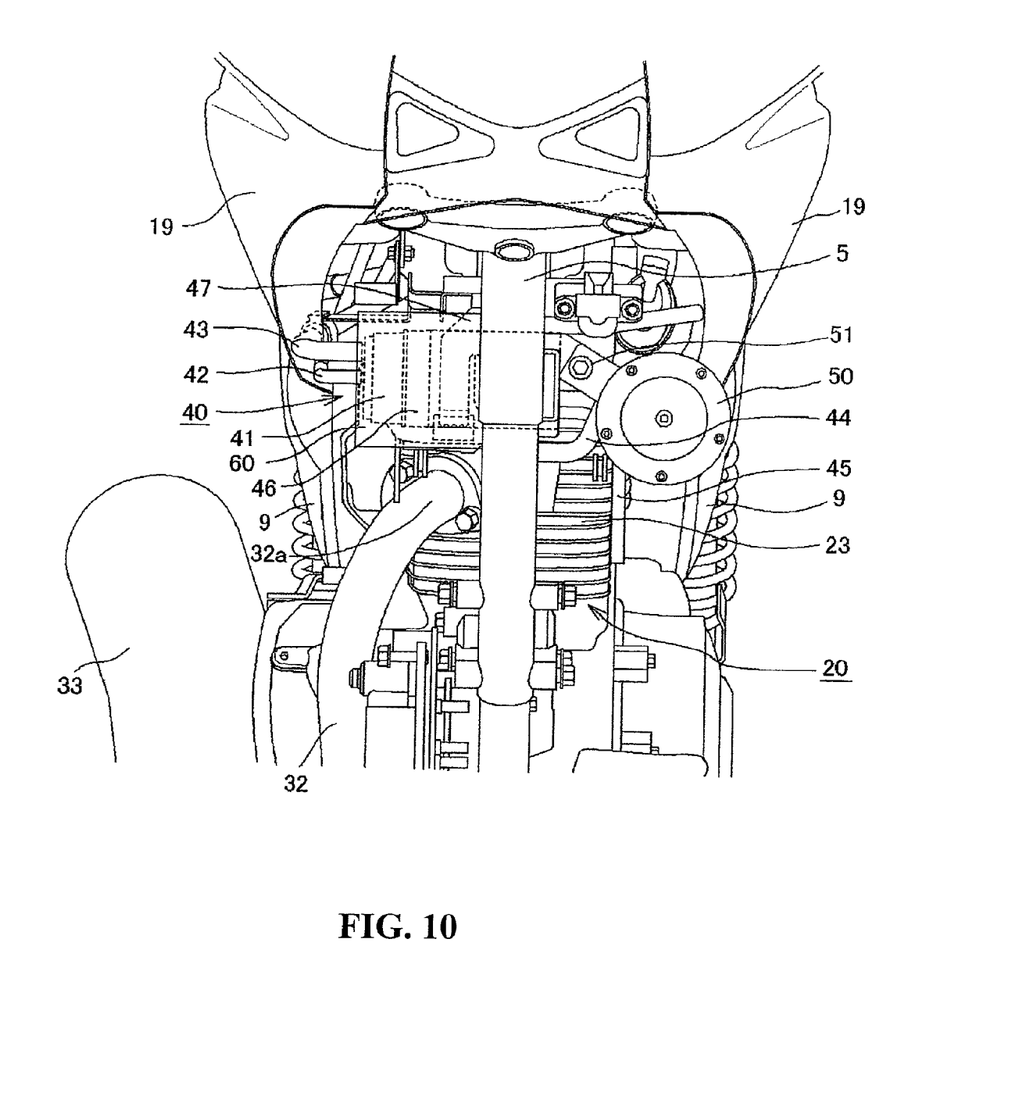
FIG. 10 is a cross-sectional view taken along a line X-X in FIG. 9.

In the motorcycle 1 according to the embodiment, the improvement of the purging efficiency is achieved by alleviating a flow of air blowing against the canister 41 by covering the canister 41 with the down tube 5, the canister holder 46, and the front fender 14 in front view and preventing the lowering of the atmospheric temperature of the canister 41. However, as shown in FIGS. 9 and 10, by providing a plate-shaped wind break panel 60 configured to cover the entire of the canister 41 in front view on the down tube 5 on the front surface of the canister 41, a flow of air blowing against the canister 41 may be prevented. By providing the wind break panel 60 on the front surface of the canister, a flow of air blowing against the canister 41 can further be prevented. Thus, a further improvement of the purging efficiency is achieved. In addition, sunlight shining on the canister 41 from the front surface of the vehicle is prevented when the vehicle is parked. Thus, a further improvement of the charge efficiency is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   a vehicle body frame including a head pipe configured to axially support a steering shaft, a main frame extending rearwardly and downwardly from the head pipe, and a down tube extending downwardly from the head pipe;
   an internal combustion engine supported by the vehicle body frame, including a crankcase, a cylinder, and a cylinder head, and a head cover, the cylinder extending upwardly from the crankcase;
   a fuel tank arranged on an upper side of the main frame; and
   an air-intake apparatus configured to supply air to the internal combustion engine, wherein an evaporable fuel storage container, configured to store evaporating fuel generated in the fuel tank of the motorcycle and supply the evaporating fuel to the air-intake apparatus when the internal combustion engine is in operation, is arranged in a space on a lower side of the fuel tank and on a front or on an upper side of the cylinder of the internal combustion engine on an upper rear of the down tube,
   wherein an air-exhaust pipe connected to a front portion of the cylinder head of the internal combustion engine extends forward and then is curved and extends rearwardly,
   a muffler is mounted on a rear end of the air-exhaust pipe; and
   the evaporable fuel storage container is arranged on an upper side of a curved portion of the air-exhaust pipe, and
   the motorcycle further comprising:
   a charge piping connecting the fuel tank and the evaporable fuel storage container and configured to feed the evaporating fuel from the fuel tank to the evaporable fuel storage container;
   a purge piping connecting the evaporable fuel storage container and the air-intake apparatus of the internal combustion engine, allowing the evaporating fuel stored in the evaporable fuel storage container to be sucked into the internal combustion engine by the intake air negative pressure and performing a fuel treatment; and
   a drain piping communicating the evaporable fuel storage container with the atmospheric air, wherein the evaporable fuel storage container is mounted with a longitudinal axis thereof oriented in the vehicle width direction, the charge piping and the purge piping are connected to one side thereof, and the drain piping is connected on the other side thereof, and
   at least part of the evaporable fuel storage container on the side of the drain piping is overlapped with the down tube in a front view.

2. The motorcycle according to claim 1, wherein the motorcycle includes a side cowl formed for covering a side of a front portion of the vehicle body including parts of the fuel tank and the internal combustion engine,
   the fuel tank has a saddle shape, the side of the fuel tank is covered with the side cowl, a dome-shaped space is formed on the upper side of the internal combustion engine, and the evaporable fuel storage container is arranged at the dome-shaped space.

3. The motorcycle according to claim 1, wherein the air-exhaust pipe is connected to a front surface of the cylinder head on one of the left and right of the down tube in front view of the vehicle body, extends forward, is curved outwardly of the vehicle body and then extends rearwardly, and the evaporable fuel storage container is mounted on the down tube at a position offset toward the air-exhaust pipe.

4. The motorcycle according to claim 1, wherein the evaporable fuel storage container is mounted on a bracket provided on the down tube via a supporting member mounted for covering the outer periphery thereof, and
   the supporting member is formed for covering at least part of the evaporable fuel storage container which is not overlapped with the down tube in a front view wherein the evaporable fuel storage container is mounted on the bracket.

5. The motorcycle according to claim 1, wherein the motorcycle includes a wind break panel provided on the vehicle body frame or a side cover, and
   the wind break panel is arranged on a front side of the evaporable fuel storage container.

6. The motorcycle according to claim 1, wherein a saddle portion bottom plate of the fuel tank is formed to incline upwardly from the rear to the front.

7. The motorcycle according to claim 1, wherein the evaporable fuel storage container is positioned on a lower side of an upper end portion of a front fender.

8. A fuel tank for use with a motorcycle comprising:
   an air-intake apparatus configured to supply air to an internal combustion engine; and
   an evaporable fuel storage container configured to store evaporating fuel generated in the fuel tank of the motorcycle and supply the evaporating fuel to the air-intake apparatus when the internal combustion engine is in operation, said evaporable fuel storage container being arranged in a space on the lower side of the fuel tank and on a front or on an upper side of a cylinder of the internal combustion engine, wherein an air-exhaust pipe connected to a front portion of a cylinder head of the internal combustion engine extends forward and then is curved and extends rearwardly, a muffler is mounted on a rear end of the air-exhaust pipe; and the evaporable fuel storage container is arranged on an upper side of a curved portion of the air-exhaust pipe, and the motorcycle further comprising:

a charge piping connecting the fuel tank and the evaporable fuel storage container and configured to feed the evaporating fuel from the fuel tank to the evaporable fuel storage container;

a purge piping connecting the evaporable fuel storage container and the air-intake apparatus of the internal combustion engine, allowing the evaporating fuel stored in the evaporable fuel storage container to be sucked into the internal combustion engine by the intake air negative pressure and performing a fuel treatment; and a drain piping communicating the evaporable fuel storage container with the atmospheric air, wherein the evaporable fuel storage container is mounted with a longitudinal axis thereof oriented in the vehicle width direction, the charge piping and the purge piping are connected to one side thereof, and the drain piping is connected on the other side thereof, and at least part of the evaporable fuel storage container on the side of the drain piping is overlapped with the down tube in a front view.

9. The fuel take for use with a motorcycle according to claim 8, wherein an air-exhaust pipe connected to a front portion of the cylinder head of the internal combustion engine extends forward and then is curved and extends rearwardly, a muffler is mounted on a rear end of the air-exhaust pipe; and the evaporable fuel storage container is arranged on the upper side of a curved portion of the air-exhaust pipe.

10. The motorcycle according to claim 8, wherein the evaporable fuel storage container is mounted on a bracket provided on the down tube via a supporting member mounted for covering the outer periphery thereof, and the supporting member is formed for covering at least part of the evaporable fuel storage container which is not overlapped with the down tube in the front view wherein the evaporable fuel storage container is mounted on the bracket.

11. The motorcycle according to claim 8, wherein the motorcycle includes a wind break panel provided on the vehicle body frame or a side cover, and the wind break panel is arranged on a front side of the evaporable fuel storage container.

12. The motorcycle according to claim 8, wherein an electrical component provided on the motorcycle is mounted on a side opposite from an offset side of the evaporable fuel storage container.

* * * * *